(12) United States Patent
Ha

(10) Patent No.: US 12,487,728 B2
(45) Date of Patent: Dec. 2, 2025

(54) TERMINAL AND METHOD FOR SETTING MENU ENVIRONMENTS IN THE TERMINAL

(71) Applicant: Samsung Electronics Co., Ltd., Suwon-si (KR)

(72) Inventor: Young-Hee Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/170,930

(22) Filed: Feb. 17, 2023

(65) Prior Publication Data

US 2023/0205398 A1    Jun. 29, 2023

Related U.S. Application Data

(63) Continuation of application No. 16/906,529, filed on Jun. 19, 2020, now Pat. No. 11,586,340, which is a (Continued)

(30) Foreign Application Priority Data

Jun. 19, 2012 (KR) .......................... 10-2012-0065402

(51) Int. Cl.
*G06F 3/0482* (2013.01)
*G06F 3/01* (2006.01)
*G06F 3/04817* (2022.01)
*G06F 3/04842* (2022.01)
*G06F 3/0488* (2022.01)
(Continued)

(52) U.S. Cl.
CPC ............ *G06F 3/0482* (2013.01); *G06F 3/017* (2013.01); *G06F 3/04817* (2013.01); *G06F 3/04842* (2013.01); *G06F 3/0488* (2013.01); *G06F 3/04883* (2013.01); *H04M 1/72469* (2021.01); *G06F 2203/04808* (2013.01)

(58) Field of Classification Search
CPC ............... G06F 3/0482; G06F 3/04883; G06F 3/04842; G06F 3/0416; G06F 3/0414; G06F 3/017; G06F 3/04817; G06F 3/0488; G06F 2203/04808; H04M 1/1724
See application file for complete search history.

(56) References Cited

U.S. PATENT DOCUMENTS 5,612,719 A    3/1997    Beernink et al.
5,995,101 A    11/1999   Clark et al.
(Continued)

FOREIGN PATENT DOCUMENTS

CA    2 551 596 A1    1/2008
EP    2 2492 40 A1    11/2010
(Continued)

OTHER PUBLICATIONS

Abhiroop Basu, "Great List of Android Widgets for Tweaking and Monitoring Your Device Setting", XP055675155, Sep. 2, 2011.
(Continued)

*Primary Examiner* — Justin R. Blaufeld
(74) *Attorney, Agent, or Firm* — Jefferson IP Law, LLP

(57) ABSTRACT

An apparatus and method for setting a menu environment in a mobile terminal are provided. The apparatus includes a controller for switching to an environment setting mode of a menu according to a type of a gesture having occurred on the menu.

18 Claims, 6 Drawing Sheets

Related U.S. Application Data continuation of application No. 15/172,734, filed on Jun. 3, 2016, now Pat. No. 10,712,907, which is a continuation of application No. 13/920,581, filed on Jun. 18, 2013, now Pat. No. 9,372,542.

(51) Int. Cl.
*G06F 3/04883* (2022.01)
*H04M 1/72469* (2021.01)

(56) References Cited

U.S. PATENT DOCUMENTS

| | | | |
|---|---|---|---|
| 7,472,357 B1 * | 12/2008 | Satterfield | G06F 3/0482 715/752 |
| 7,818,672 B2 | 10/2010 | McCormack et al. | |
| 8,286,106 B2 | 10/2012 | Bergman | |
| 8,504,935 B2 | 8/2013 | Stallings et al. | |
| 8,547,244 B2 | 10/2013 | Duarte | |
| 8,665,209 B2 | 3/2014 | Rimas-Ribikauskas et al. | |
| 8,943,439 B2 | 1/2015 | Yoshioka | |
| 10,712,907 B2 * | 7/2020 | Ha | G06F 3/0488 |
| 11,586,340 B2 * | 2/2023 | Ha | G06F 3/0482 |
| 2004/0036714 A1 | 2/2004 | Blakely et al. | |
| 2005/0057498 A1 | 3/2005 | Gentle | |
| 2005/0071761 A1 | 3/2005 | Konito | |
| 2005/0091609 A1 | 4/2005 | Matthews et al. | |
| 2005/0114778 A1 | 5/2005 | Branson et al. | |
| 2005/0193351 A1 | 9/2005 | Huoviala | |
| 2006/0053387 A1 | 3/2006 | Ording | |
| 2006/0101350 A1 | 5/2006 | Scott | |
| 2007/0039023 A1 | 2/2007 | Kataoka | |
| 2007/0067734 A1 | 3/2007 | Cunningham et al. | |
| 2007/0157115 A1 | 7/2007 | Peters | |
| 2007/0198950 A1 | 8/2007 | Dodge et al. | |
| 2008/0104639 A1 | 5/2008 | Yoon | |
| 2008/0295015 A1 | 11/2008 | Liu et al. | |
| 2009/0150819 A1 | 6/2009 | Cheong et al. | |
| 2009/0307105 A1 | 12/2009 | Lemay et al. | |
| 2009/0322498 A1 | 12/2009 | Yun et al. | |
| 2010/0026640 A1 | 2/2010 | Kim | |
| 2010/0083190 A1 | 4/2010 | Roberts et al. | |
| 2010/0156813 A1 | 6/2010 | Duarte et al. | |
| 2010/0271312 A1 | 10/2010 | Alameh et al. | |
| 2010/0295795 A1 | 11/2010 | Wilairat | |
| 2010/0302179 A1 | 12/2010 | Ahn et al. | |
| 2010/0315358 A1 | 12/2010 | Chang et al. | |
| 2011/0050630 A1 | 3/2011 | Ikeda | |
| 2011/0054837 A1 | 3/2011 | Ikeda | |
| 2011/0066978 A1 | 3/2011 | Sung | |
| 2011/0131513 A1 | 6/2011 | Yamamoto | |
| 2011/0187655 A1 | 8/2011 | Min et al. | |
| 2011/0187667 A1 | 8/2011 | Kaida | |
| 2011/0252346 A1 | 10/2011 | Chaudhri | |
| 2011/0252372 A1 | 10/2011 | Chaudhri | |
| 2011/0252381 A1 | 10/2011 | Chaudhri | |
| 2011/0302491 A1 | 12/2011 | Griffin et al. | |
| 2012/0036552 A1 | 2/2012 | Dare et al. | |
| 2012/0137236 A1 | 5/2012 | Abe et al. | |
| 2012/0144469 A1 | 6/2012 | Ainslie et al. | |
| 2013/0002720 A1 * | 1/2013 | Chang | G06F 3/0488 345/660 |
| 2013/0111342 A1 | 5/2013 | Alameh et al. | |
| 2013/0120306 A1 | 5/2013 | Furukawa | |
| 2013/0215044 A1 * | 8/2013 | Ahn | G06F 3/0482 345/173 |
| 2013/0227413 A1 | 8/2013 | Thorsander et al. | |
| 2014/0026062 A1 | 1/2014 | Proudfoot et al. | |
| 2015/0062052 A1 | 3/2015 | Bernstein et al. | |
| 2015/0067596 A1 | 3/2015 | Brown et al. | |

FOREIGN PATENT DOCUMENTS

| | | |
|---|---|---|
| EP | 2 426 597 A1 | 3/2012 |
| JP | 2003-248551 A | 9/2003 |
| JP | 2011-204175 A | 10/2011 |
| JP | 2012-032891 A | 2/2012 |
| KR | 10-2008-0071316 A | 8/2008 |
| KR | 10-2010-0014095 A | 2/2010 |
| KR | 10-2010-0038858 A | 4/2010 |
| KR | 10-0954324 B1 | 4/2010 |
| KR | 10-2010-0091806 A | 8/2010 |
| KR | 10-2011-0088930 A | 8/2011 |
| KR | 10-2011-0111000 A | 10/2011 |

OTHER PUBLICATIONS

European Examination report dated Mar. 19, 2020, issued in European Application No. 17186385.5.
Jae Gon Kim and Jun-Dong Cho, "Huffman user interface for full touch screen based mobile phones," 2010 The 12th International Conference on Advanced Communication Technology (ICACT), Phoenix Park, 2010, pp. 1021-1026. (Year: 2010).
Korean Examination Report dated Dec. 2, 2019, issued in Korean Application No. 10-2012-0065402.
Korean Notification of the Reasons for Rejection dated Feb. 28, 2019; Application No. 10-2012-0065402.
LG KM900; LG KM900 Arena review; A touch of class; http:/lweb.archive.org/web/20090924103533/http://www.Usmarena.com/lg_km900_arena-review-345p4; Apr. 24, 2009.
European Search Report dated Jun. 30, 2021, issued in European Application No. 20191592.3.
Extended European Search Report dated Nov. 6, 2020, issued in European Application No. 20191592.3.
European Examination Report dated Oct. 31, 2023; European Appln. No. 23 185 936.4-1224.
Extended European Search Report dated Aug. 21, 2025; European Appln. No. 25166476.9-1218 / 4586067.

* cited by examiner

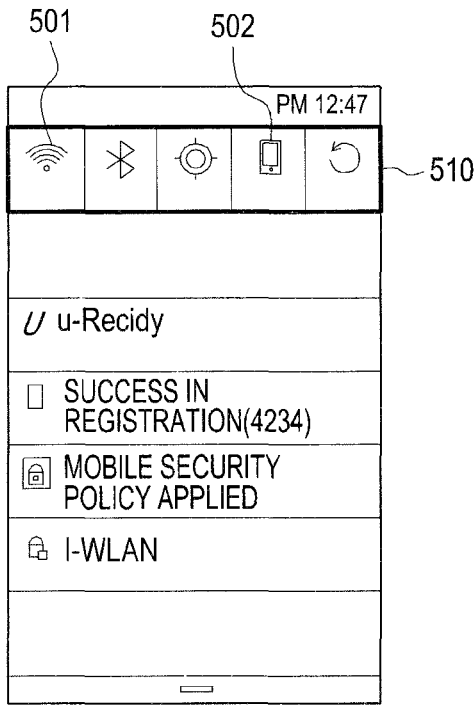
FIG.5A
FIG.5B
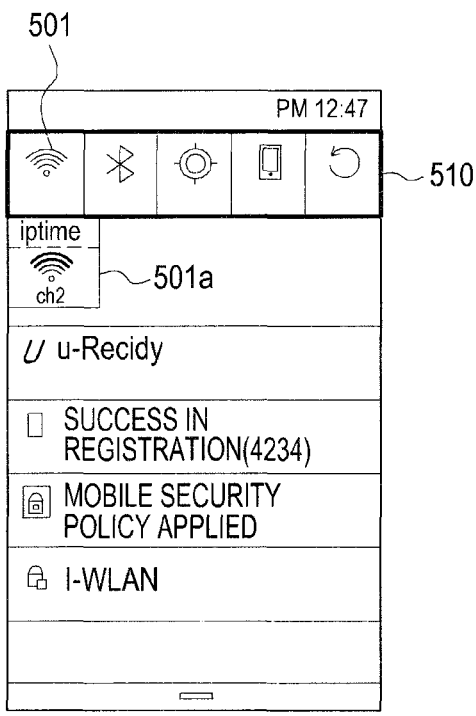
FIG.5C
FIG.5D

TERMINAL AND METHOD FOR SETTING MENU ENVIRONMENTS IN THE TERMINAL

CROSS-REFERENCE TO RELATED APPLICATION(S)

This application is a continuation application of prior application Ser. No. 16/906,529 filed on Jun. 19, 2020, which has issued as U.S. Pat. No. 11,586,640 on Feb. 21, 2023; which is a continuation application of prior application Ser. No. 15/172,734 filed on Jun. 3, 2016, which has issued as U.S. Pat. No. 10,712,907 on Jul. 14, 2020; which is a continuation application of prior application Ser. No. 13/920,581 filed on Jun. 18, 2013, which issued as U.S. Pat. No. 9,372,542 on Jun. 21, 2016, and which claimed the benefit under 35 U.S.C. § 119(a) of a Korean patent application 10-2012-0065402, filed on Jun. 19, 2012 in the Korean Intellectual Property Office, the disclosure of which is incorporated by references herein in its entirety.

BACKGROUND OF THE INVENTION

1. Field of the Invention

The present invention relates to a terminal and a method for setting menu environments in the terminal. More particularly, the present invention relates to a terminal and a menu environment setting method for allowing a user to conveniently switch to environment setting modes of menus in the terminal.

2. Description of the Related Art

A variety of menus for running their related functions are displayed on a screen of a terminal. If one of the menus displayed on the screen is selected or touched by a user, its associated function is carried out.

However, in order to change environments of the menus, the user needs to switch to environment setting modes of the menus through a number of steps. For example, a quick panel of Android® Operating System (OS)-based smart phones may display menus such as Wireless Fidelity (Wi-Fi), Bluetooth, Global Positioning System (GPS), Call Notification, and Auto-Rotation. If a touch occurs on an arbitrary menu among the menus displayed on the quick panel, a function related to the touched menu is activated or enabled, and if a touch occurs again on the arbitrary menu, the activated function is deactivated or disabled in a toggle manner.

As described above, the user may activate or deactivate functions of the menus displayed on the quick panel by touching the menus. However, the user needs to go through several steps in order to switch to environment setting modes of the menus. For example, the user must select a main menu on a home screen, select an environment setting menu in the main menu, and then select an environment setting mode for one of displayed menus. As another example, the user needs to enter an option button on the home screen, select an environment setting menu in a displayed option menu, and then select an environment setting mode for one of displayed menus.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a terminal and a menu environment setting method for quickly and intuitively switching to an environment setting mode of a menu in the terminal Another aspect of the present invention is to provide a menu environment setting apparatus and method for handily viewing currently set environment information on a menu, in a terminal.

Another aspect of an exemplary embodiment of the present invention is to provide a terminal and a menu environment setting method for allowing a user to conveniently view environment information currently set on a menu, in the terminal.

In accordance with an aspect of the present invention, there is provided which includes a controller for, if a first gesture occurs on a specific menu, directly switching to an environment setting mode of specific menu, in which an environment for a function of the specific menu may be set.

In accordance with another aspect of the present invention, there is provided a terminal, which includes a controller for setting activation or inactivation for a Wireless Fidelity (Wi-Fi) function if a short touch occurs on a Wi-Fi menu among a plurality of menus in a quick panel including the plurality of menus, and directly switching to an environment setting mode of the Wi-Fi menu if a double touch occurs on the Wi-Fi menu.

In accordance with further another aspect of the present invention, there is provided a terminal, which includes a controller for setting a type of a call notification menu if a short touch occurs on the call notification menu among a plurality of menus in a quick panel including the plurality of menus, and directly switching to an environment setting mode of the call notification menu if a double touch occurs on the call notification menu.

In accordance with yet another aspect of the present invention, there is provided a method for setting a menu environment in a terminal. The method includes, if a gesture occurs on a specific menu, determining a type of the gesture which has occurred on the specific menu; and if a first gesture occurs on the specific menu, directly switching to an environment setting mode of the specific menu, in which an environment for a function of the specific menu may be set.

In accordance with still another aspect of the present invention, there is provided a method for setting a menu environment in a terminal. The method includes displaying a plurality of menus on a quick panel; if a short touch occurs on a Wireless Fidelity (Wi-Fi) menu among the plurality of menus, setting activation or inactivation for a Wi-Fi function; and if a double touch occurs on the Wi-Fi menu, directly switching to an environment setting mode of the Wi-Fi menu.

In accordance with still another aspect of the present invention, there is provided a method for setting a menu environment in a terminal. The method includes displaying a plurality of menus on a quick panel; if a short touch occurs on a call notification menu among the plurality of menus, setting a type of the call notification menu; and if a double touch occurs on the call notification menu, directly switching to an environment setting mode of the call notification menu.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 5A to 5E illustrate display screens provided for a description of the processes shown in FIGS. 2 to 4.

Throughout the drawings, like reference numerals will be understood to refer to like parts, components, and structures.

DETAILED DESCRIPTION OF EXEMPLARY EMBODIMENTS

Figure 1:
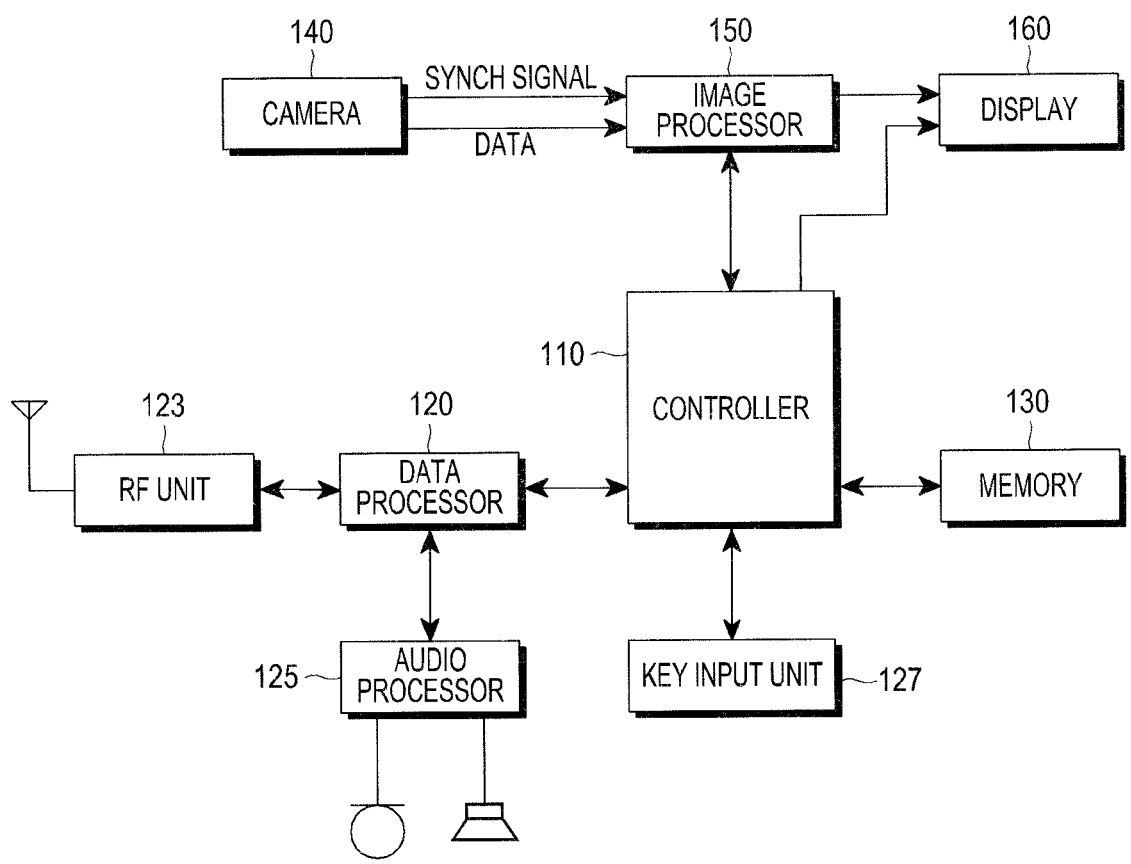
FIG. 1 illustrates a structure of a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are described in detail with reference to the accompanying drawings. The same or similar components may be designated by the same or similar reference numerals although they are illustrated in different drawings.

A terminal according to an exemplary embodiment of the present invention includes a portable terminal and a fixed terminal. The portable terminal may be a mobile electronic device, such as a videophone, a portable phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic-Book (E-Book) reader, a portable computer (e.g., a laptop Personal Computer (PC) or a tablet PC), and a digital camera. The fixed terminal may be a desktop PC.

FIG. 1 illustrates a structure of a terminal according to an exemplary embodiment of the present invention.

Referring to FIG. 1, a Radio Frequency (RF) unit 123 is responsible for radio communication of the terminal. The RF unit 123 includes an RF transmitter for frequency up-converting transmission signals and amplifying the up-converted signals, and an RF receiver for low-noise-amplifying received signals and frequency down-converting the amplified signals. A data processor 120 includes a transmitter for encoding and modulating the transmission signals, and a receiver for demodulating and decoding the received signals. In other words, the data processor 120 may include modem and a codec. The codec includes a data codec for processing packet data, and an audio codec for processing audio signals such as voice. An audio processor 125 plays received audio signals output from the audio codec in the data processor 120 using a speaker, and transfers transmission audio signals picked up by a microphone to the audio codec in the data processor 120.

A key input unit 127 includes numeric/character keys for inputting numeric and character information and function keys for setting various functions.

A memory 130 may include a program memory and a data memory. The program memory may store programs for controlling the general operation of the terminal. In accordance with an exemplary embodiment to the present invention, the memory 130 may store a control program for switching to an environment setting mode of a menu according to a type of a gesture. The data memory may temporarily store the data generated during execution of these programs.

The controller 110 controls the overall operation of the terminal. In accordance with an exemplary embodiment of the present invention, the controller 110 switches to an environment setting mode of a menu according to a type of a gesture having occurred on the menu. The controller 110 runs a related function of the menu or displays currently set environment information on the menu, according to the type of the gesture having occurred on the menu.

While displaying the currently set environment information on the menu in a pop-up window, the controller 110 runs the related function of the menu or switches to the environment setting mode of the menu, according to the type of the gesture having occurred on the menu. While displaying the currently set environment information on the menu in a pop-up window, the controller 110 switches to the environment setting mode of the menu according to the type of the gesture having occurred in the pop-up window. The type of the gesture may include a short touch, a long touch, a double touch, a multi-touch, a drag, and a pressure-sensitive touch.

The controller 110 determines the type of the gesture having occurred on the menu, and may run the related function of the menu if the type of the gesture is a short touch, switch to the environment setting mode of the menu if the type of the gesture is a long touch, and display the currently set environment information on the menu if the type of the gesture is a double touch.

While displaying the currently set environment information on the menu in the pop-up window, the controller 110 may run the related function of the menu if a short touch occurs on the menu. While displaying the currently set environment information on the menu in the pop-up window, the controller 110 may switch to the environment setting mode of the menu if a long touch occurs on the menu. While displaying the currently set environment information on the menu in the pop-up window, the controller 110 may switch to the environment setting mode of the menu if a short touch occurs in the pop-up window. The controller 110 may display the menu in a different color or shape according to the type of the gesture having occurred on the menu.

A camera 140 includes a camera sensor for capturing images and converting the captured optical image signal into an electrical signal, and a signal processor for converting the analog image signal captured by the camera sensor into digital data. The camera sensor may be a Charge-Coupled Device (CCD) or Complementary Metal-Oxide-Semiconductor (CMOS) sensor, and the signal processor may be implemented with a Digital Signal Processor (DSP). The camera sensor and the signal processor may be implemented either in an integrated way, or in a separated way.

An image processor 150 performs Image Signal Processing (ISP) for displaying the image signals output from the camera 140 on a display 160. The ISP may include gamma correction, interpolation, spatial variations, image effects, image scaling, Automatic White Balance (AWB), Automatic Exposure (AE), and Automatic Focus (AF). The image processor 150 processes the image signals output from the camera 140 on a frame-by-frame basis, and outputs the frame image data according to the characteristics and size of the display 160. The image processor 150 includes a video codec, which compresses the frame image data displayed on the display 160 by a preset coding scheme, and decompresses the compressed frame image data into the original frame image data. The video codec may include a Joint Photographic Experts Group (JPEG) codec, a Moving Picture Experts Group 4 (MPEG4) codec, and a Wavelet codec. The image processor 150 may have an On-Screen Display (OSD) function, and may output OSD data according to the size of the displayed screen, under control of the controller 110.

The display 160 displays, on its screen, image signals output from the image processor 150 and user data output from the controller 110. The display 160 may include a Liquid Crystal Display (LCD). In this case, the display 160 may include an LCD controller, a memory capable of storing image data, and an LCD panel. When implemented as a touch screen, the LCD may serve as an input unit. In this case, the same keys as those on the key input unit 127 may be displayed on the display 160.

The display 160 may display the menu in a different color or shape according to the type of the gesture having occurred on the menu. An operation of controlling a menu in the above-described terminal is described below with reference to FIGS. 2 to 5E.

Figure 2:
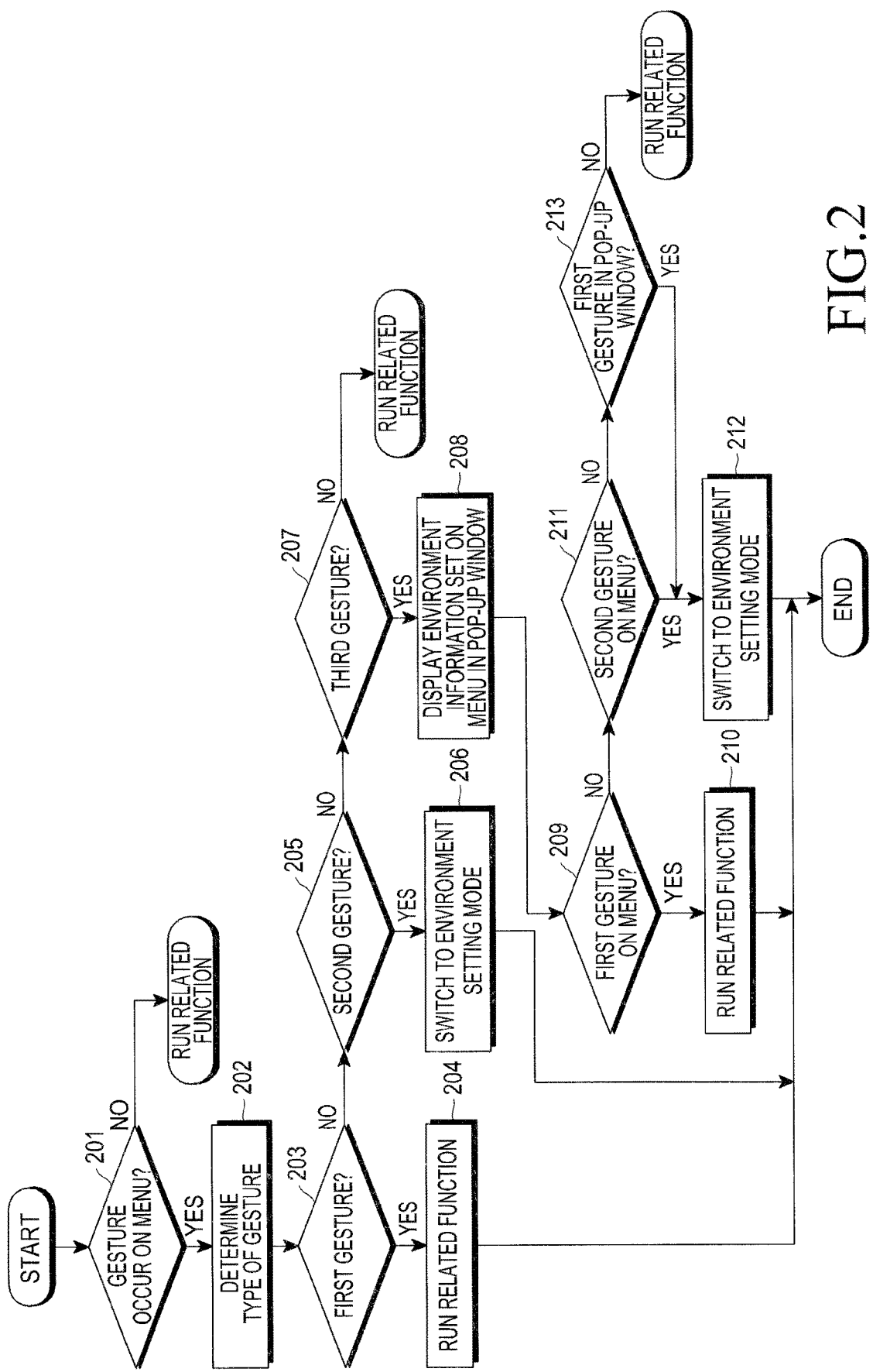
FIG. 2 is a flowchart illustrating a process of controlling a menu according to a type of a gesture in a terminal according to an exemplary embodiment of the present invention.

FIG. 2 is a flowchart illustrating a process of controlling a menu according to a type of a gesture in a terminal according to an exemplary embodiment of the present invention. The process illustrated in FIG. 2 will be described with reference to FIG. 1.

Referring to FIG. 2, the controller 110 determines in step 201 whether a gesture occurs on a specific menu among menus displayed on the terminal, and determines a type of the gesture having occurred on the specific menu in step 202, if a gesture occurs on the specific menu.

The controller 110 determines in step 203 whether the gesture having occurred on the specific menu is a first gesture, and runs a related function of the specific menu in step 204, if the gesture having occurred on the specific menu is the first gesture.

The controller 110 determines in step 205 whether the gesture having occurred on the specific menu is a second gesture, and directly switches to an environment menu setting mode of the specific menu in step 206, if the gesture having occurred on the specific menu is the second gesture.

The controller 110 determines in step 207 whether the gesture having occurred on the specific menu is a third gesture, and displays currently set environment information on the specific menu in step 208, if the gesture having occurred on the specific menu is the third gesture.

In step 208, the controller 110 may display the currently set environment information on the specific menu in a pop-up window near the specific menu.

While displaying the currently set environment information on the specific menu in the pop-up window, the controller 110 determines in step 209 whether the first gesture occurs on the specific menu, and runs the related function of the specific menu in step 210 if the first gesture occurs on the specific menu.

While displaying the currently set environment information on the specific menu in the pop-up window, the controller 110 determines in step 211 whether the second gesture occurs on the specific menu, and directly switches to the environment menu setting mode of the specific menu in step 212 if the second gesture occurs on the specific menu.

While displaying the currently set environment information on the specific menu in the pop-up window, the controller 110 determines in step 213 whether the first gesture occurs in the pop-up window, and directly switches to the environment menu setting mode of the specific menu in step 212 if the first gesture occurs in the pop-up window.

Although it is assumed in the above processes that the first gesture is to execute the function of a menu, the second gesture is to switch to an environment setting mode of the menu, and the third gesture is to display the environment information set for the menu, it is not intended to limit the scope of the invention thereto. Therefore, it can be understood that executing the function of a menu, switching to an environment setting mode of the menu, or displaying the environment information set for the menu may be performed in response to any one of the first to third gestures. The first to third gestures may be any one of a short touch, a long touch, a double touch, a multi-touch, a drag, and a pressure-sensitive touch, and may also include a type of a motion of the terminal (e.g. motion to the left or right, side to side motion, up/down motion, etc.).

Accordingly, the corresponding function may be performed by the second or third gesture, the switching to an environment setting mode of the menu may be performed by the first or third gesture, and the display of the environment information set for the menu may be performed by the first or second gesture.

For example, after the user selects a specific menu, the controller 110 may run a related function of the specific menu, switch to an environment setting mode of the specific menu, or display currently set environment information on the specific menu, according to the motion direction of a terminal. The types of gestures for controlling the specific menu may be set by the user.

An operation of controlling a menu according to a type of gesture in a terminal is described below with reference to FIGS. 3 to 5E.

Figure 3:
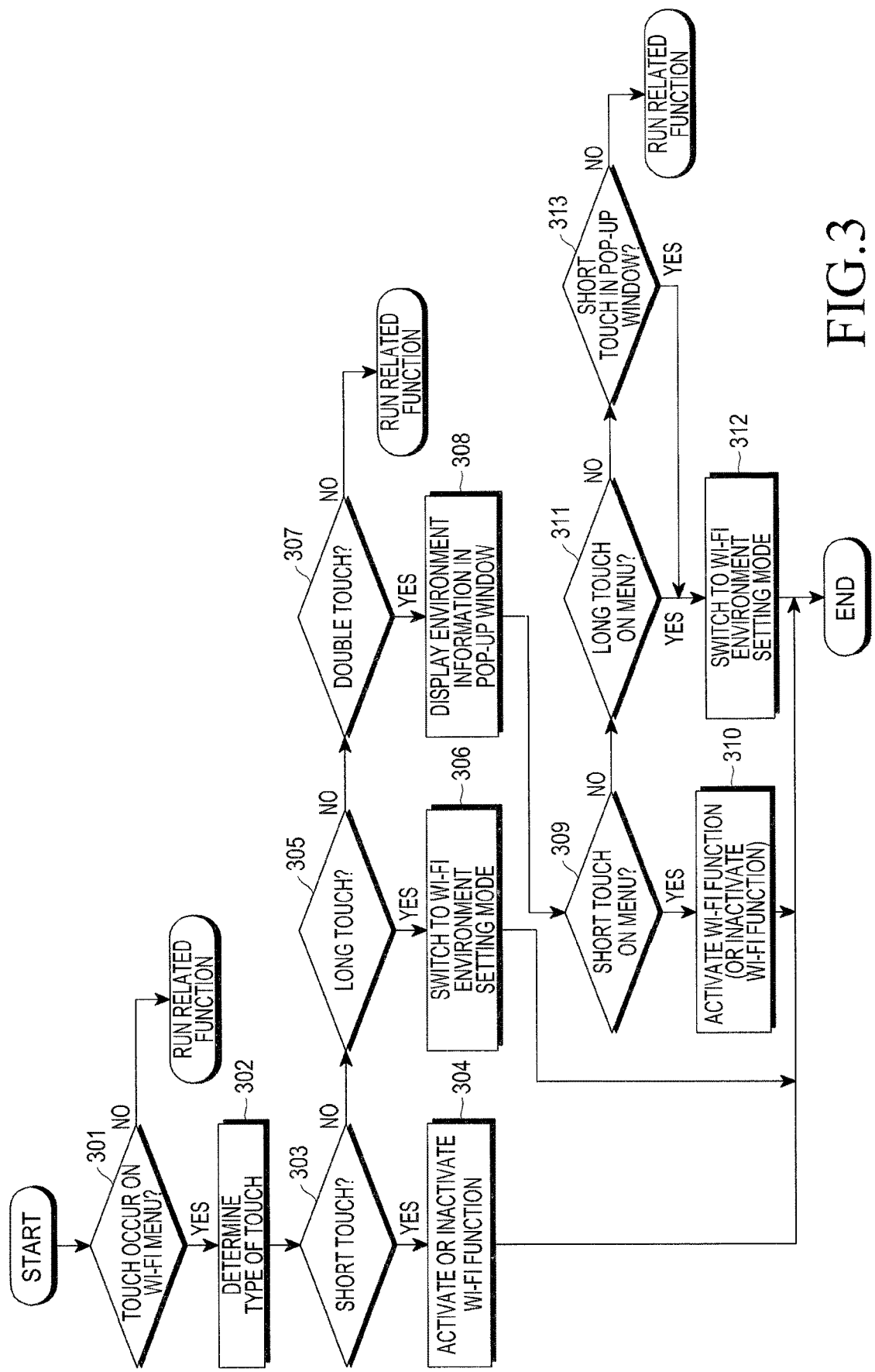
FIG. 3 is a flowchart illustrating a process of controlling a Wireless Fidelity (Wi-Fi) menu according to a type of a gesture in a terminal according to an exemplary embodiment of the present invention.
Figure 4:
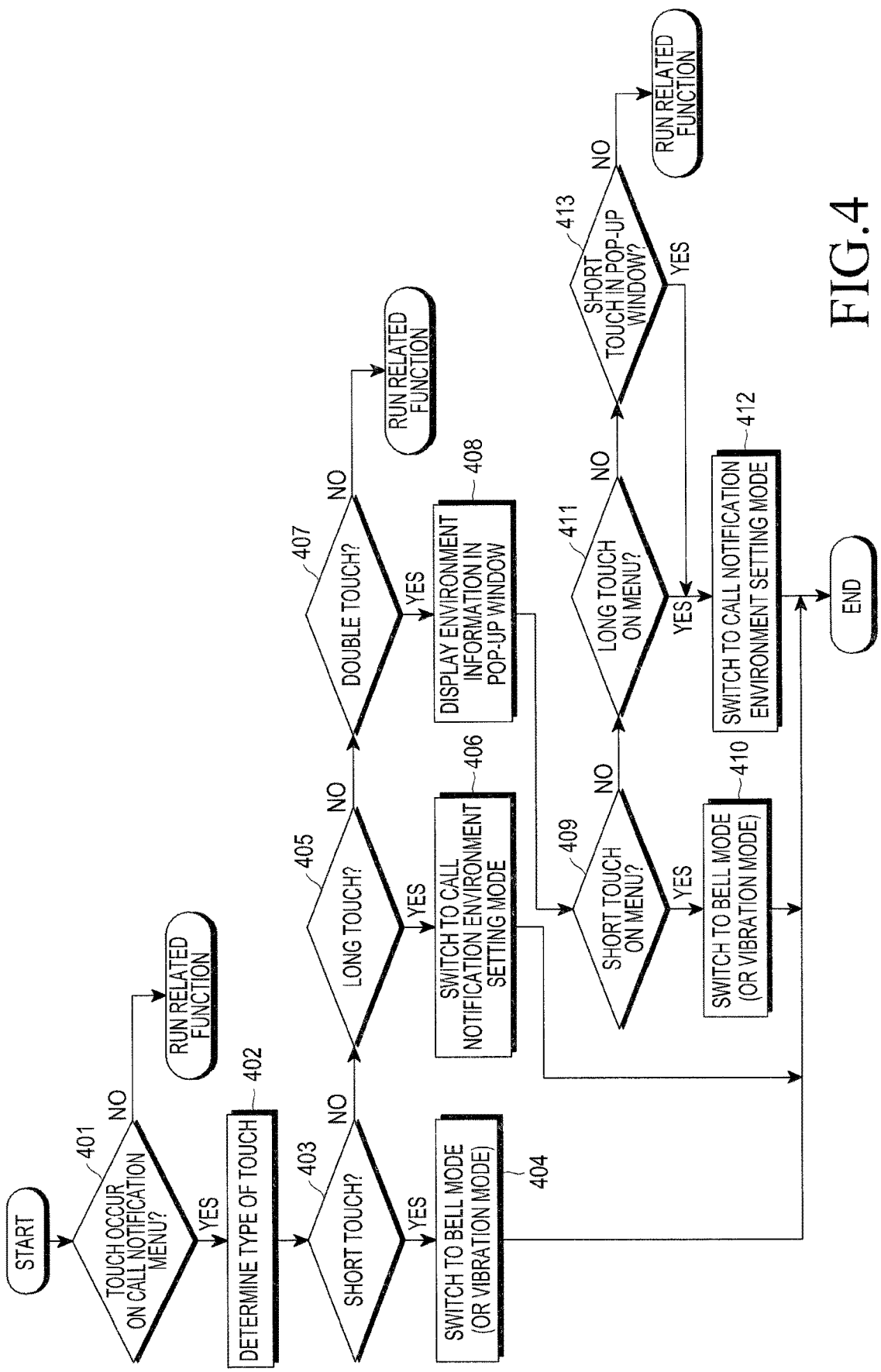
FIG. 4 is a flowchart illustrating a process of controlling a call notification menu according to a type of a gesture in a terminal according to an exemplary embodiment of the present invention.

FIG. 3 is a flowchart illustrating a process of controlling a Wi-Fi menu according to a type of a gesture in a terminal according to an exemplary embodiment of the present invention. FIG. 4 is a flowchart illustrating a process of controlling a call notification menu according to a type of a gesture in a terminal according to an exemplary embodiment of the present invention. FIGS. 5A to 5E illustrate display screens provided for a description of the processes shown in FIGS. 2 to 4.

Referring to FIGS. 3, 4, and 5A-5E, the menus may be controlled according to various different types of touches: a short touch indicating an action in which a touch occurs within a predetermined time, a long touch indicating an action in which a touch lasts for a predetermined time or more, and a double touch indicating an action in which two successive touches occur within a predetermined time.

The processes shown in FIGS. 3 and 4 will be described in detail below with reference to FIGS. 1, and 5A to 5E.

An operation of controlling a Wi-Fi menu 501 displayed on a quick panel 510 is described with reference to FIG. 3. If a top-to-bottom drag occurs starting from an upper part of a screen of the display 160 in a standby mode, the controllers 110 displays the quick panel 510 having preset menus as illustrated in FIG. 5A.

Referring to FIG. 3, the controller 110 determines in step 301 whether a touch occurs on the Wi-Fi menu 501 on the quick panel 510, and determines a type of the touch having occurred on the Wi-Fi menu 501 in step 302 if the touch occurs on the Wi-Fi menu 501.

The controller 110 determines in step 303 whether the type of the touch having occurred on the Wi-Fi menu 501 is a short touch. If the type of the touch having occurred on the Wi-Fi menu 501 is the short touch, then in step 304 the controller 110 activates a Wi-Fi function if the Wi-Fi function is presently inactive and deactivates the Wi-Fi function if the Wi-Fi function is presently active.

The controller 110 determines in step 305 whether the type of the touch having occurred on the Wi-Fi menu 501 is a long touch, and directly switches to a Wi-Fi environment setting mode, as illustrated in FIG. 5B, in which the Wi-Fi environment may be set, in step 306 if the type of the touch having occurred on the Wi-Fi menu 501 is the long touch.

The controller 110 determines in step 307 whether the type of the touch having occurred on the Wi-Fi menu 501 is a double touch, and displays currently set environment information on the Wi-Fi menu 501 in step 308 if the type of the touch having occurred on the Wi-Fi menu 501 is the double touch.

In step 308, the controller 110 may display the currently set environment information on the Wi-Fi menu 501 in a pop-up window near the Wi-Fi menu 501.

The controller 110 may display the currently set environment information on the Wi-Fi menu 501 if the Wi-Fi menu 501 is presently active, and announce deactivation of the Wi-Fi function or display environment information previously set on the Wi-Fi menu 501 if the Wi-Fi menu 501 is presently inactive. The controller 110 may display, in the pop-up window, a type of a router currently or previously connected to the terminal and signal strength of the router as the environment information set on the Wi-Fi menu 501. In FIG. 5C, the controller 110 displays a type "iptime™" of a router currently connected to the terminal and a signal strength of the router as the environment information set on the Wi-Fi menu 501 in a pop-up window 501a near the Wi-Fi menu 501, if the Wi-Fi menu 501 is presently active.

While displaying the currently set environment information on the Wi-Fi menu 501 in the pop-up window 501a, the controller 110 determines in step 309 whether the short touch occurs on the Wi-Fi menu 501, and activates or deactivates the Wi-Fi menu 501 in step 310 if the short touch occurs on the Wi-Fi menu 501.

While displaying the currently set environment information on the Wi-Fi menu 501 in the pop-up window 501a, the controller 110 determines in step 311 whether the long touch occurs on the Wi-Fi menu 501, and directly switches to an environment setting mode of the Wi-Fi menu 501 (as illustrated in FIG. 5B) is step 312 if the long touch occurs on the Wi-Fi menu 501.

While displaying the currently set environment information on the Wi-Fi menu 501 in the pop-up window 501a, the controller 110 determines in step 313 whether the double touch occurs in the pop-up window 501a, and directly switches to the environment setting mode of the Wi-Fi menu 501 (as illustrated in FIG. 5B) in step 312 if the double touch occurs in the pop-up window.

An operation of controlling a call notification menu displayed on the quick panel 510 is described below with reference to FIG. 4. If a top-to-bottom drag occurs starting from an upper part of a screen of the display 160 in a standby mode, the controller 110 displays the quick panel 510 having preset menus as illustrated in FIG. 5A.

Referring to FIG. 4, the controller 110 determines in step 401 whether a touch occurs on a call notification menu 502 on the quick panel 510, and determines a type of the touch having occurred on the call notification menu 502 in step 402 if the touch occurs on the call notification menu 502 on the quick panel 510.

The controller 110 determines in step 403 whether the type of the touch having occurred on the call notification menu 502 is a short touch, and changes a type of the call notification menu 502 in step 404 if the type of the touch having occurred on the call notification menu 502 is the short touch. For example, in step 404, the controller 110 switches to a bell mode if the type of the call notification menu 502 is currently set as a vibration mode, and switches to the vibration mode if the type of the call notification menu 502 is currently set as the bell mode.

The controller 110 determines in step 405 whether the type of the touch having occurred on the call notification menu 502 is a long touch, and directly switches to a call notification environment setting mode in which a call notification environment may be set (as illustrated in FIG. 5D), in step 406 if the type of the touch having occurred on the call notification menu 502 is the long touch.

The controller 110 determines in step 407 whether the type of the touch having occurred on the call notification menu 502 is a double touch, and displays currently set environment information on the call notification menu 502 in step 408 if the type of the touch having occurred on the call notification menu 502 is the double touch.

Figure 5E:
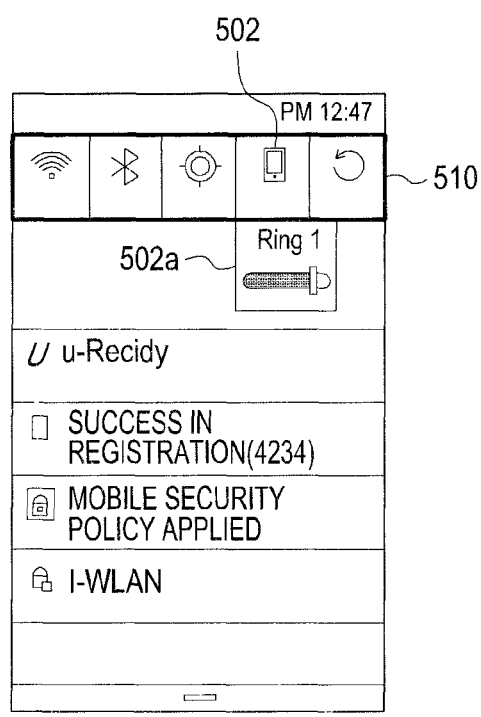

In step 408, the controller 110 may display the currently set environment information on the call notification menu 502 in a pop-up window near the call notification menu 502. For example, the controller 110 may display a detailed vibration setting (e.g., "vibration always") and vibration strength information as the currently set environment information on the call notification menu 502 if the type of the call notification menu 502 is a vibration mode, or bell type and bell volume information as the currently set environment information on the call notification menu 502 if the type of the call notification menu 502 is a bell mode. In FIG. 5E, the controller 110 displays bell type ("Ring1") and bell volume information as the currently set environment information on the call notification menu 502 in a pop-up window 502*a* near the call notification menu 502 if the type of the call notification menu 502 is the bell mode.

While displaying the currently set environment information on the call notification menu 502 in the pop-up window 502*a*, the controller 110 determines in step 409 whether the short touch occurs on the call notification menu 502, and switches a type of the call notification menu 502 to a bell mode or a vibration mode in step 410 if the short touch occurs on the call notification menu 502.

While displaying the currently set environment information on the call notification menu 502 in the pop-up window 502*a*, the controller 110 determines in step 411 whether the long touch occurs on the call notification menu 502, and directly switches to the environment setting mode of the call notification menu 502 (as illustrated in FIG. 5D) in step 412 if the long touch occurs on the call notification menu 502.

While displaying the currently set environment information on the call notification menu 502 in the pop-up window 502*a*, the controller 110 determines in step 413 whether the double touch occurs in the pop-up window 502*a*, and directly switches to the environment setting mode of the call notification menu 502 (as illustrated in FIG. 5D) in step 412 if the double touch occurs in the pop-up window 502*a*.

In FIGS. 3 to 4, operations of running a related function of a menu, quickly switching to an environment setting mode of the menu, and displaying environment information of the menu, according to a type of a gesture having occurred on the menu on a quick panel, are described. These operations may be equally performed through an icon indicating an application of the terminal, not only the menu on the quick panel.

While displaying a plurality of icons indicating their related applications, the controller 110 determines a type of a gesture having occurred on an arbitrary icon. The controller 110 switches to an application mode corresponding to the arbitrary icon if the type of the gesture having occurred on the arbitrary icon is the first gesture. The controller 110 quickly switches to an environment setting mode of an application mode corresponding to the arbitrary icon if the type of the gesture having occurred on the arbitrary icon is the second gesture.

The controller 110 may display currently set environment information on the application corresponding to the arbitrary icon in a pop-up window near the arbitrary icon if the type of the gesture having occurred on the arbitrary icon is the third gesture.

While displaying the pop-up window near the arbitrary icon, the controller 110 switches to the application mode corresponding to the arbitrary icon if the first gesture occurs on the arbitrary icon, or switches to the environment setting mode of the application corresponding to the arbitrary icon if the second gesture occurs on the arbitrary icon, or switches to the environment setting mode of the application corresponding to the arbitrary icon if the third gesture occurs on the arbitrary icon.

For example, while displaying a plurality of icons indicating their related applications, the controller 110 may switch to a message mode if the first gesture occurs on an icon indicating a message application (message application icon), or switch to an environment setting mode of the message mode if the second gesture occurs on the message application icon, or display currently set environment information on the message application in a pop-up window near the message application icon if the third gesture occurs on the message application icon.

While displaying the pop-up window near the message application icon, the controller 110 switches to the message mode if the first gesture occurs on the message application icon, or switches to the environment setting mode of the message mode if the second gesture occurs on the message application icon, or switches to the environment setting mode of the message mode if the third gesture occurs in the pop-up window.

An apparatus and method for setting a menu environment in a terminal, according to an exemplary embodiment of the present invention, may be implemented by computer-readable codes stored in a non-transitory computer-readable recording medium. The computer-readable recording medium may include all types of recording devices in which data readable by the computer system is stored. Examples of the recording medium may include a Read-Only Memory (ROM), a Random-Access Memory (RAM), an optical disk, a magnetic tape, a floppy disk, a hard disk, and a non-volatile memory.

As is apparent from the foregoing description, exemplary embodiments of the present invention may allow the user to conveniently switch to an environment setting mode of a menu, and to easily view currently set environment information on the menu by providing a shortened path for setting a menu environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a touch sensor;
   a display;
   at least one processor; and
   at least one memory storing computer program instructions configured, if executed by the at least one processor, to cause the apparatus at least to:
   display a plurality of icons respectively corresponding to a plurality of different applications on the display,
   detect a first touch input at an icon corresponding to an application among the plurality of icons respectively corresponding to the plurality of different applications using the touch sensor, wherein the application corresponding to the icon at which the first touch input is detected is inactive,
   based on the first touch input being identified as a first input gesture, execute the application corresponding to the icon, and
   based on the first touch input being identified as a second input gesture:
   display a pop-up window on the display while the application remains inactive, the pop-up window including a menu having settings for configuring an operation of the application,
   detect a second touch input using the touch sensor on the menu included in the pop-up window,
   based on the second touch input being identified as the first input gesture at the pop-up window, display, on the display, a setting screen that can be modified by a user, the setting screen including a menu for modifying the settings for configuring the operation of the application, and update the menu having settings for configuring the operation of the application included in the pop-up window based on the modification on the setting screen.

2. The apparatus of claim 1, wherein the first input gesture is a short touch gesture and the second input gesture is a long touch gesture.

3. The apparatus of claim 1,
wherein the first input gesture is one of a long touch gesture, a double touch gesture, a multi-touch gesture, a drag gesture, or a pressure level-based gesture, and
wherein the second input gesture is another of the long touch gesture, the double touch gesture, the multi-touch gesture, the drag gesture, or the pressure level-based gesture, the second input gesture being a different type of gesture from the first input gesture.

4. The apparatus of claim 1, wherein, to execute the application corresponding to the icon based on the first touch input being identified as the first input gesture, the computer program instructions are further configured, if executed by the at least one processor, to cause the apparatus to:
initiate a first timer upon detecting the first touch input, and
execute the application corresponding to the icon after the first touch input is maintained for a first time duration based on the first timer.

5. The apparatus of claim 4, wherein, to display the pop-up window on the display, based on the first touch input being identified as the second input gesture, the computer program instructions are further configured, if executed by the at least one processor, to cause the apparatus to:
initiate a second timer upon detecting the second touch input, and
display the pop-up window on the display after the second touch input is maintained for a second time duration based on the second timer.

6. The apparatus of claim 1, further comprising:
a pressure sensor,
wherein, to display the pop-up window on the display, based on the first touch input being identified as the second input gesture, the computer program instructions are further configured, if executed by the at least one processor, to cause the apparatus to:
determine a pressure value of the second input gesture based on a signal generated by the pressure sensor, and
display the pop-up window on the display, based on the pressure value exceeding a predetermined pressure value.

7. The apparatus of claim 1, wherein the application is configured to control a network interface.

8. An apparatus comprising:
a touch sensor;
a display;
at least one processor; and
at least one memory storing computer program instructions configured, if executed by the at least one processor, to cause the apparatus at least to:
display a plurality of icons respectively corresponding to a plurality of different applications on the display,
detect a first touch input at an icon corresponding to an application among the plurality of icons respectively corresponding to the plurality of different applications using the touch sensor, wherein the application corresponding to the icon at which the first touch input is detected is inactive,
based on the first touch input being identified as a short press input, execute the application corresponding to the icon, and
based on the first touch input being identified as a long press input:
display a pop-up window on the display while the application remains inactive, the pop-up window including a menu having settings for configuring an operation of the application,
detect a second touch input on the menu included in the pop-up window using the touch sensor,
based on the second touch input being identified as the short press input at the pop-up window, display, on the display, a setting screen that can be modified by a user, the setting screen including a menu for modifying the settings for configuring the operation of the application, and
update the menu having settings for configuring the operation of the application included in the pop-up window based on the modification on the setting screen.

9. The apparatus of claim 8, wherein, to execute the application corresponding to the icon, the computer program instructions are further configured, if executed by the at least one processor, to cause the apparatus to:
initiate a timer upon detecting the first touch input, and
execute the application corresponding to the icon, based on the first touch input not being maintained for a time duration based on the timer.

10. The apparatus of claim 9, wherein, to display the pop-up window on the display, the computer program instructions are further configured, if executed by the at least one processor, to cause the apparatus to:
display the pop-up window on the display, based on the first touch input being maintained for the time duration based on the timer.

11. The apparatus of claim 8, wherein the application is configured to control a network interface.

12. A portable communication apparatus comprising:
a touch screen display;
at least one processor; and
at least one memory storing computer program instructions configured, if executed by the at least one processor, to cause the portable communication apparatus at least to:
display an icon corresponding to a function on the touch screen display,
detect a first touch input at the icon using the touch screen display, wherein the function corresponding to the icon at which the first touch input is detected is inactive,
based on the first touch input being identified as a first input gesture, execute the function corresponding to the icon, and
based on the first touch input being identified as a second input gesture:
display a pop-up window on the touch screen display including a menu having settings for configuring an operation of the function,
detect a second touch input using the touch screen display on the menu having settings for configuring the operation of the function,
based on the second touch input being identified as the first input gesture at the pop-up window, display, on the touch screen display, a setting screen, associated with the pop-up window, in a full screen mode that can be modified by a user, the setting screen including a menu for modifying the settings for configuring the operation of the function, and update the menu having settings for configuring the operation of the function based on the modification on the setting screen.

13. The portable communication apparatus of claim 12, wherein the first input gesture is a short touch gesture and the second input gesture is a long touch gesture.

14. The portable communication apparatus of claim 12, wherein the first input gesture is one of a long touch gesture, a double touch gesture, a multi-touch gesture, a drag gesture, or a pressure level-based gesture, and wherein the second input gesture is another of the long touch gesture, the double touch gesture, the multi-touch gesture, the drag gesture, or the pressure level-based gesture, the second input gesture being a different type of gesture from the first input gesture.

15. The portable communication apparatus of claim 12, wherein, to execute the function corresponding to the icon based on the first touch input being identified as the first input gesture, the computer program instructions are further configured, if executed by the at least one processor, to cause the portable communication apparatus to:

initiate a first timer upon detecting the first touch input, and execute the function corresponding to the icon after the first touch input is maintained for a first time duration based on the first timer.

16. The portable communication apparatus of claim, 15, wherein, to display the pop-up window on the touch screen display, based on the first touch input being identified as the second input gesture, the computer program instructions are further configured, if executed by the at least one processor, to cause the portable communication apparatus to:

initiate a second timer upon detecting the second touch input, and display the pop-up window on the touch screen display after the second touch input is maintained for a second time duration based on the second timer.

17. The portable communication apparatus of claim 12, further comprising:

a pressure sensor, wherein, to display the pop-up window on the touch screen display, based on the first touch input being identified as the second input gesture, the computer program instructions are further configured, if executed by the at least one processor, to cause the portable communication apparatus to:

determine a pressure value of the second input gesture based on a signal generated by the pressure sensor, and display the pop-up window on the touch screen display, based on the pressure value exceeding a predetermined pressure value.

18. An apparatus comprising:

a touch sensor;

a display;

at least one processor; and at least one memory storing computer program instructions configured, if executed by the at least one processor, to cause the apparatus at least to:

display a plurality of icons respectively corresponding to a plurality of different applications on the display, detect a first touch input at an icon corresponding to an application among the plurality of icons respectively corresponding to the plurality of different applications using the touch sensor, wherein the application corresponding to the icon at which the first touch input is detected is inactive, based on the first touch input being identified as a first input gesture, execute the application corresponding to the icon, and based on the first touch input being identified as a second input gesture:

display a pop-up window on the display, the pop-up window including a menu having settings for configuring an operation of the application, detect a second touch input using the touch sensor on the menu included in the pop-up window, based on the second touch input being identified as the first input gesture at the pop-up window, display, on the display, a setting screen that can be modified by a user, the setting screen including a menu for modifying the settings for configuring the operation of the application, and update the menu having settings for configuring the operation of the application included in the pop-up window based on the modification on the setting screen.

* * * * *